US006826345B1

(12) United States Patent
Zhong et al.

(10) Patent No.: US 6,826,345 B1
(45) Date of Patent: Nov. 30, 2004

(54) TOP CAP PROCESS FOR REDUCING POLARIZATION DEPENDENT WAVELENGTH SHIFT IN PLANAR LIGHTWAVE CIRCUITS

(75) Inventors: Fan Zhong, Fremont, CA (US); Farnaz Parhami, Fremont, CA (US); Zhigang Zhou, Fremont, CA (US)

(73) Assignee: Lightwave Microsystems Corporation, San Jose, CA (US)

( * ) Notice: Subject to any disclaimer, the term of this patent is extended or adjusted under 35 U.S.C. 154(b) by 68 days.

(21) Appl. No.: 10/165,903

(22) Filed: Jun. 10, 2002

(51) Int. Cl.[7] .............................................. G02B 6/10
(52) U.S. Cl. ...................................................... 385/129
(58) Field of Search ......................................... 385/129

(56) References Cited

U.S. PATENT DOCUMENTS

| | | | | |
|---|---|---|---|---|
| 4,902,086 A | 2/1990 | Henry et al. | ............ | 350/96.12 |
| 5,917,981 A | 6/1999 | Kovacic et al. | ............ | 385/131 |
| 5,982,973 A | 11/1999 | Yan et al. | ............ | 385/141 |
| 6,078,704 A | 6/2000 | Bischel et al. | ............ | 385/4 |
| 6,122,303 A | 9/2000 | Major, Jr. | ............ | 372/45 |
| 6,171,876 B1 | 1/2001 | Yuang et al. | ............ | 438/22 |
| 6,236,774 B1 | 5/2001 | Lackritz et al. | ............ | 385/14 |
| 6,311,004 B1 | 10/2001 | Kenney et al. | ............ | 385/130 |
| 6,341,189 B1 | 1/2002 | Deacon | ............ | 385/130 |
| 6,341,190 B1 | 1/2002 | Summersgill et al. | ............ | 385/130 |
| 6,343,171 B1 | 1/2002 | Yoshimura et al. | ............ | 385/50 |
| 6,396,988 B1 * | 5/2002 | Shimoda | ............ | 385/129 |
| 6,501,895 B1 * | 12/2002 | Bloechl et al. | ............ | 385/129 |
| 6,528,338 B2 * | 3/2003 | Bazylenko | ............ | 438/31 |
| 2002/0018634 A1 * | 2/2002 | Korenaga et al. | ............ | 385/132 |
| 2002/0122650 A1 * | 9/2002 | Kominato et al. | ............ | 385/131 |
| 2003/0021513 A1 * | 1/2003 | Parhami et al. | ............ | 385/11 |
| 2003/0031445 A1 * | 2/2003 | Parhami et al. | ............ | 385/129 |

* cited by examiner

Primary Examiner—Mark Tremblay
(74) Attorney, Agent, or Firm—Amin & Turocy, LLP

(57) ABSTRACT

One aspect of the invention relates to a PLC containing at least one waveguide on a bottom clad layer, each waveguide having a top cap layer on an upper surface thereof, and a top clad layer over the waveguides having the top cap on the upper portion thereof. The presence of the top cap reduces waveguide birefringence and resultant polarization dependence in PLCs, particularly for reducing polarization dependent wavelength shift in AWGs. Another aspect of the invention relates to methods of making PLCs involving forming a waveguide layer on a bottom clad layer, forming a top cap layer on the waveguide layer, patterning the waveguide layer and the top cap layer using a mask to form waveguides having a top cap on an upper portion thereof, and forming a top clad layer over the waveguides having the top cap on the upper portion thereof.

20 Claims, 3 Drawing Sheets

TOP CAP PROCESS FOR REDUCING POLARIZATION DEPENDENT WAVELENGTH SHIFT IN PLANAR LIGHTWAVE CIRCUITS

FIELD OF THE INVENTION

The present invention generally relates to fabricating planar lightwave circuits that exhibit reduced polarization dependent wavelength shift. In particular, the present invention relates to providing a top cap structure over waveguides within planar lightwave circuits as a means to reduce polarization dependent wavelength shift.

BACKGROUND OF THE INVENTION

As optical networks increasingly carry burgeoning Internet traffic, the need for advanced and efficient optical components rises. Optical communication systems permit the transmission of large quantities of information. Improved optical integrated circuits (OICs) are particularly needed. OICs come in many forms such as 1×N optical splitters, optical switches, wavelength division multiplexers (WDMs), demultiplexers, optical add/drop multiplexers (OADMs), and the like. Optical circuits allow branching, coupling, switching, separating, multiplexing and demultiplexing of optical signals without intermediate transformation between optical and electrical media.

Such optical circuits include planar lightwave circuits (PLCs) having optical waveguides on flat substrates, which can be used for routing optical signals from one of a number of input optical fibers to any one of a number of output optical fibers or optical circuitry. PLCs make it possible to achieve higher densities, greater production volume and more diverse functions than are available with fiber components through employment of manufacturing techniques typically associated with the semiconductor industry. For instance, PLCs contain optical paths known as waveguides formed on a silicon wafer substrate, wherein the waveguides are made from transmissive media which have a higher refractive index than the chip substrate or the outlying cladding layers in order to guide light along the optical path. PLCs are fashioned to integrate multiple components and functionalities into a single optical chip.

One important application of PLCs specifically and OICs generally involves wavelength-division multiplexing (WDM) including dense wavelength-division multiplexing (DWDM). DWDM allows optical signals of different wavelengths, each carrying separate information, to be transmitted via a single optical channel or fiber in an optical network. In order to provide advanced multiplexing and demultiplexing (e.g., DWDM) and other functions in such networks, arrayed-waveguide gratings (AWGs) have been developed in the form of PLCs.

A problem with PLCs is polarization dependence of the waveguides, typically caused by thermal stress induced waveguide birefringence. Such birefringence is experienced in varying degrees with waveguide fabrication process. The difference in thermal expansion coefficient between the waveguide top cladding layer and the substrate causes thermal stress. That stress imposed on the waveguide core in a direction parallel to the surface usually is different from that in a perpendicular direction. When the stress is asymmetric to the waveguide core, birefringence is induced undesirably rotating the optical axes.

Stress induced waveguide birefringence results in a difference of refractive index of the waveguide in the direction between parallel and perpendicular to the waveguide. The birefringence, in turn, causes polarization dependence in the waveguides, where the propagation constant for TE (transverse electric) mode is different from TM (transverse magnetic) mode. Consequently, the device characteristics change in accordance with the polarized state of the light provided to the device. For AWG device, this difference in propagation constants results in a wavelength shift in the spectral response peak or the passband of each wavelength channel. A conventional AWG may exhibit a polarization dependent wavelength shift of 0.1 nm, which is sufficient to undesirably impact the performance of a PLC containing the AWG.

One method of reducing thermal stress induced birefringence and resultant polarization dependent wavelength shift involves matching the coefficient of thermal expansion of the top cladding with the coefficient of thermal expansion of the substrate. This can be accomplished by doping the top cladding with boron, if silicon wafer is used as substrate. However, high boron concentrations in the top cladding lead to corrosion problems.

This polarization sensitivity or dependence in AWGs and other dispersive components can be minimized by bisecting the waveguides with a half waveplate, in a slot between waveguide portions. The half waveplate causes polarization swapping partway along the optical paths of the bisected waveguides, such that any input polarization samples each propagation constant equally and provides essentially no shift in peak wavelength with changes in input polarization. Thus, the spectrum for the TE and TM modes coincide through the use of the half waveplate.

There are three concerns with the use of half waveplates. First, a small fraction of the light propagating through the waveguide may be reflected back toward the input by the half waveplate, leading to unacceptably high back reflection and directivity measurements. Thus, although the conventional use of the half waveplate reduces the polarization sensitivity problems associated with waveguide birefringence, back reflection is increased.

Second, the mere presence of a half waveplate bisecting the waveguides generates insertion loss. Insertion loss is the total optical power loss caused by the insertion of an optical component, such as a half waveplate in this instance, into an optic system. Insertion loss is expressed in dB, and is determined by the difference between the input optical power and output optical power. For example, a half waveplate bisecting the waveguides of an AWG can introduce an insertion loss of 0.5 dB.

Furthermore, the fabrication of PLCs is complicated by the extra processing steps associated with forming and precisely positioning half waveplate therein.

Polarization dependence of optical network components, such as polarization dependent wavelength shift in AWGs affect a system's performance, especially when there are many components in the system. Consequently, there remains a need for better solutions to reduce polarization dependence in planar waveguide circuits such as AWGs, which avoid or mitigate the back-reflection problems and insertion loss problems associated with the conventional employment of half waveplates in such devices.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Rather, the sole purpose of this summary is to present some concepts of the invention in a simplified form as a prelude to the more detailed description that is presented hereinafter. The present invention provides PLCs and methods for reducing waveguide birefringence and resultant polarization dependence in PLCs, especially for reducing polarization dependent wavelength shift in AWGs. The PLCs/AWGs of the present invention exhibiting reduced polarization dependent wavelength shift do so while mitigating insertion loss and/or increasing corrosion resistance.

One aspect of the invention relates to a PLC containing a bottom clad layer on a substrate, at least one waveguide on the bottom clad layer, each waveguide having a top cap layer on an upper surface thereof, and a top clad layer over the waveguides having a top cap an upper portion thereof.

Another aspect of the invention relates to a method of making a PLC involving forming a bottom clad layer on a substrate, forming a waveguide layer on the bottom clad layer, forming a top cap layer on the waveguide layer, patterning the waveguide layer and the top cap layer using a mask to form waveguides having a top cap on an upper portion thereof, and forming a top clad layer over the waveguides having a top cap an upper portion thereof.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The present invention provides avenues for reducing waveguide birefringence and resultant polarization dependence in PLCs, by balancing or equalizing stress components on waveguide cores. Stress and polarization dependent wavelength shift in PLCs can be mitigated by positioning a top cap layer adjacent and above the waveguide cores. The present invention particularly provides for reducing polarization wavelength shift in AWGs. Positioning a top cap layer adjacent and above the waveguide core also permits the reduction of the amount of doping in the top clad layer, thereby improving the corrosion resistance of the PLC. Since polarization dependent wavelength shift in PLCs can be mitigated by employing a top cap layer, the need for a waveplate is eliminated, thereby decreasing the insertion loss associated with the use of a waveplate.

Figure 1:
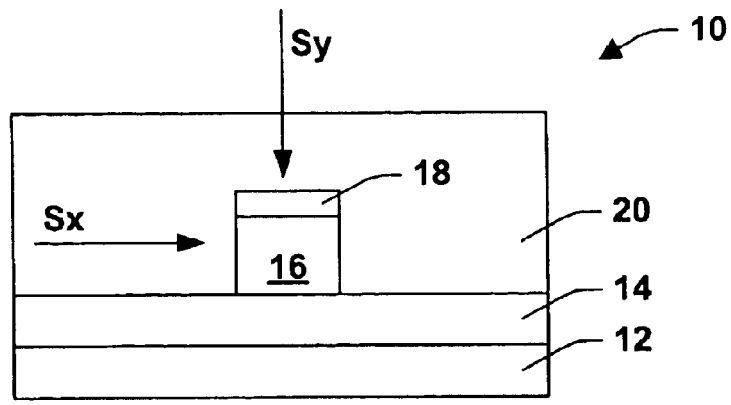
FIG. 1 illustrates a cross sectional view of a PLC showing stress vectors in accordance with one aspect of the present invention.
Figure 2:
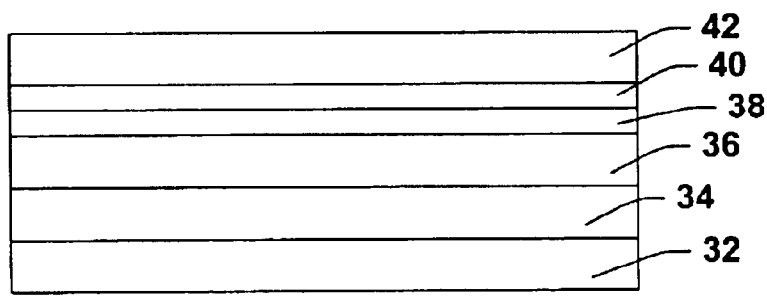
FIG. 2 illustrates a cross sectional view of a method of making a PLC in accordance with another aspect of the present invention.

Referring to FIG. 1, a cross sectional view of a PLC 10 in accordance with one aspect of the present invention with stress vectors on the waveguide core 16 is shown. By balancing the two stress components imposed on waveguide core 16 as shown in FIG. 1 (Sx denotes a stress component in the direction parallel to waveguide core and Sy denotes a stress component in the direction perpendicular to waveguide core), birefringence is reduced and/or eliminated.

Based on a waveguide stress balance model, differing stress or asymmetric stress on waveguide core (Sy−Sx does not equal zero 0) causes waveguide birefringence, the difference in effective refractive index for TE and TM polarization states, $\beta_{TM}-\beta_{TE}$, as expressed in equation (1):

$$\beta_{TM}-\beta_{TE}=k(Sx-Sy) \quad (1)$$

where k is a photoelastic coefficient for waveguide materials. Waveguide birefringence is a reason for the occurrence of polarization dependent wavelength shift (PDW) in a PLC/AWG, as expressed in equation (2):

$$PDW=\lambda_{c(TM)}-\lambda_{c(TE)}=(\beta_{TM}-\beta_{TE})\Delta L/m \quad (2)$$

where, $\lambda_c$=wavelength of light through waveguide core;

$\beta$=effective refractive index;

$\Delta L$=difference of two adjacent grating lengths; and m=diffraction order.

These two stress components on waveguide core in the x direction and y direction can be expressed in equations (3) and (4):

$$Sx=E_{CORE}\Delta T(\alpha_{sub}-\alpha_{core}) \quad (3)$$

$$Sy=E_{CORE}\Delta T(\alpha_{TC}-\alpha_{core}) \quad (4)$$

where, $E_{core}$=elastic modulus of waveguide core;

$\Delta T$=temperature range through which the waveguide materials undergo;

$\alpha_{sub}$=CTE of substrate;

$\alpha_{core}$=CTE of waveguide core; and $\alpha_{TC}$=CTE of waveguide top cladding.

Substituting equations (3) and (4) into equation (1) yields a simple relationship between waveguide birefringence and CTE mismatch, of top cladding and the substrate, as shown in equation (5):

$$\beta_{TM}-\beta_{TE}=k\,E_{CORE}\Delta T(\alpha_{sub}-\alpha_{TC}) \quad (5)$$

For example, for a c-band PLC/AWG with center wavelength of 1550 nm, fabricated on silicon wafer substrate by silica glass, polarization dependent wavelength shift can be estimated by equation (6), which is obtained by substituting equation (5) into equation (2):

$$PDW=(\Delta L/m)k\,E_{CORE}\Delta T(\alpha_{sub}-\alpha_{TC}) \quad (6)$$

For example, inputing the following parameters to equation (6), $(\Delta L/m)k=0.00366$ nm MPa$^{-1}$, $E_{CORE}=6.4\times10^{10}$ Pa, $\Delta T=1000°$ C., $\alpha_{TC}=2.97\times10^{-6}$ ° C$^{-1}$ for conventional silica top cladding and $\alpha_{sub}=3.5\times10^{-6°}$ C$^{-1}$. for silicon substrate, the calculated value of polarization dependent wavelength shift is around 0.12 nm which is consistent with the measured PDW value.

Providing a top cap layer adjacent and above the waveguide core, these two stress components on the waveguide core are altered by the thickness and CTE of the top cap layer as shown in equations (7) and (8):

$$Sx = E_{CORE} \Delta T (\alpha_{sub} - (\alpha_{core} + \alpha_{cap}(t_{cap}/t_{core}))) \quad (7)$$

$$Sy = E_{CORE} \Delta T (\alpha_{TC} - (\alpha_{core} - \alpha_{cap}(t_{cap}/t_{core}))) \quad (8)$$

where the top cap contribution is normalized by a ratio of top cap thickness, $t_{cap}$, to waveguide core thickness, $t_{core}$.

With the top cap, waveguide birefringence expressed by equation (5) and PDW in a PLC/AWG expressed by equation (6) are modified as follows:

$$\beta_{TM} - \beta_{TE} = k\, E_{CORE} \Delta T (\alpha_{Sub} - \alpha_{TC} - 2\alpha_{cap}(t_{cap}/t_{core})) \quad (9)$$

$$PDW = (\Delta L/m) k\, E_{CORE} \Delta T (\alpha_{Sub} - \alpha_{TC} - 2\alpha_{cap}(t_{cap}/t_{core})) \quad (10)$$

Given the CTE mismatch between the top cladding and the substrate as well as the CTE of top cap layer, the differing stress and resultant waveguide birefringence in equation (9) can be linearly decreased from positive value through the zero point and into a negative value by increasing top cap thickness.

Similarly, for given a PLC/AWG, equation (10) shows that increasing the thickness of top cap layer, the polarization dependent wavelength shift can be reduced linearly from positive region through the zero point and into a negative region, since that CTE mismatch, $\alpha_{Sub} - \alpha_{TC}$, can be compensated by a term related to top cap layer, $2\alpha_{cap}(t_{cap}/t_{core})$.

In one embodiment, polarization dependence in a PLCs, or polarization dependent wavelength shift in an AWG can be reduced to zero or approximately zero, by providing a top cap layer with an appropriate thickness over the waveguide core.

The PLCs of the present invention contain at least one waveguide. In this connection, the PLCs may be or contain AWGs, wavelength splitters, taps, couplers, Mach Zehnders, variable optical attenuators (VOAs), and integrated devices containing two or more thereof. The PLCs may have passive or active functions.

Referring again to FIG. 1, a cross sectional view of a PLC 10 in accordance with one aspect of the present invention is shown. The PLC10 contains a substrate 12, a bottom clad layer 14 over the substrate 12, a waveguide core 16 over the bottom clad layer 14 and extending through at least a portion of the PLC 10, a top cap layer 18 positioned above and adjacent the waveguide core 16, and a top clad layer 20 over the top cap layer 18 and the waveguide core 16. Preferably, the top clad layer 20 contacts the sidewalls of the waveguide core 16 and/or portions of the bottom clad layer 14. Due, in part, to the presence of the top cap layer 18 above the waveguide core 16, stress differences on the waveguide core 16 are reduced compared a structure without the top cap layer 18.

Referring to FIGS. 2–6, a method of making an PLC in accordance with an aspect of the present invention is shown. Specifically referring to FIG. 2, a structure 30 with a PLC substrate 32 is provided. The substrate 32 contains or is made of silica, monocrystalline silicon, indium phosphide (InP), GaAs, common semiconductor substrates, and the like. A bottom clad layer 34 is formed over the substrate 32. A waveguide layer 36 is formed over the bottom clad layer 34. A top cap layer 38 is formed over the waveguide layer 36. The waveguide layer 36 has a higher refractive index that compared to the bottom clad layer 34 and compared to the top cap layer 38. The refractive index of the bottom clad layer 34 and the top cap layer 38 is the same or different.

The bottom clad layer 34, waveguide layer 36, and the top cap layer 38 independently contain of one or more of doped silica; undoped silica; thermo-optic polymers; electro-optic polymers; semiconductors such as InP, GaAs; germanium, and the like; silicon oxynitride; silicate glasses such as tetraethylorthosilicate (TEOS), phosphosilicate glass (PSG), fluorosilicate glass (FSG), borophosphosilicate glass (BPSG), borophospho-tetraethylorthosilicate (BPTEOS), germanium phosphosilicate glass (GePS), germanium borophosphosilicate glass (GeBPSG), germanium posophosphosilicate, and the like. These layers are formed using any suitable technique such as chemical vapor deposition (CVD) techniques including low pressure CVD (LPCVD) and plasma enhanced CVD (PECVD), ion implanting, in situ doping, annealing, spin-on techniques, and the like.

The thickness of each of the bottom clad layer 34, waveguide layer 36, and the top cap layer 38 is suitable to facilitate the subsequent formation of waveguides out of the waveguide layer 36. The thickness of the bottom clad layer 34 is not critical to the present invention. In one embodiment, the thickness of the bottom clad layer 34 is about 10 microns or more and about 50 microns or less.

In one embodiment, the thickness of the waveguide core layer 36 is about 1 micron or more and about 20 microns or less. In another embodiment, the thickness of the waveguide core layer 36 is about 2 microns or more and about 10 microns or less. In yet another embodiment, the thickness of the waveguide core layer 36 is about 5 microns or more and about 8 microns or less. The thickness of the top cap layer 38 is discussed below.

An optional hard mask layer 40 is formed over the top cap layer 38 using any suitable technique. The optional hard mask layer 40 contains a material with high selectivity from the waveguide layer 36 and the top cap layer 38 to facilitate subsequent formation of waveguides from the waveguide core layer 36. A photoresist 42 is formed over the optional hard mask layer 40 (or over the top cap layer 38 in the event a hard mask layer is not employed).

Figure 3:
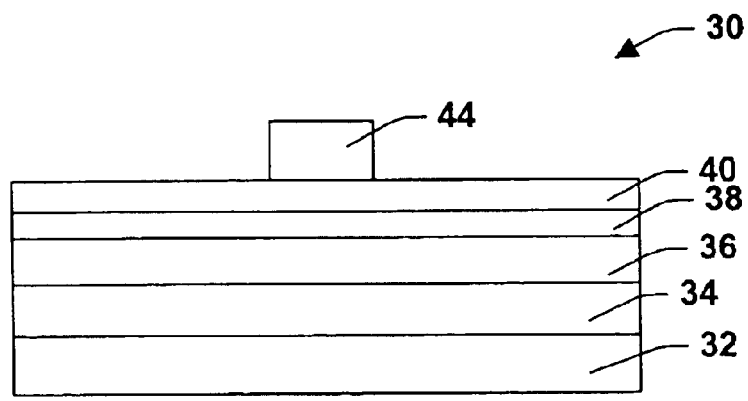
FIG. 3 illustrates a cross sectional view of a method of making a PLC in accordance with another aspect of the present invention.

Referring to FIG. 3, photolithographic techniques are employed to irradiate and develop the photoresist 42 into a patterned photoresist 44, thereby exposing portions of the optional hard mask layer 40. The shape of patterned photoresist 44 corresponds with the shape of the subsequently formed waveguides.

Figure 4:
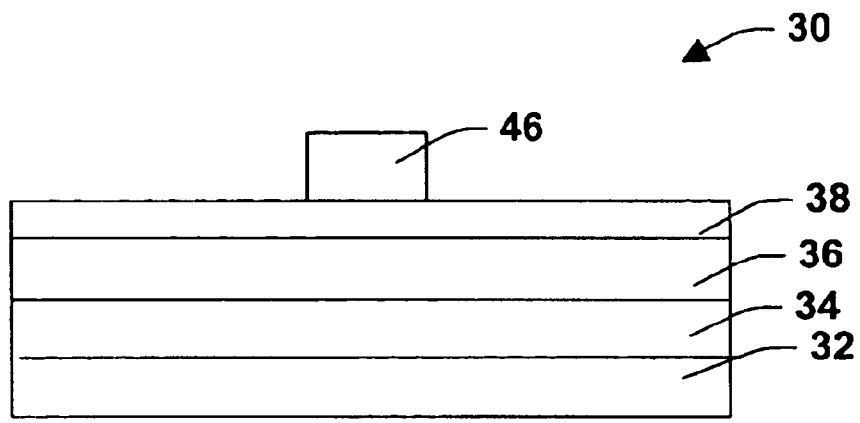
FIG. 4 illustrates a cross sectional view of a method of making a PLC in accordance with another aspect of the present invention.

Referring to FIG. 4, the patterned photoresist 44 is used as a mask to shape the underlying optional hard mask layer 40 into a patterned hard mask 46, thereby exposing portions of the top cap layer 38. That is, the exposed portions of the optional hard mask layer 40 (not covered by patterned photoresist 44) are removed from the structure 30 using an etching technique. Wet or dry, liquid or plasma etching techniques may be employed. In embodiments where a hard mask layer is not employed, patterned structure 46 may represent the patterned photoresist.

Figure 5:
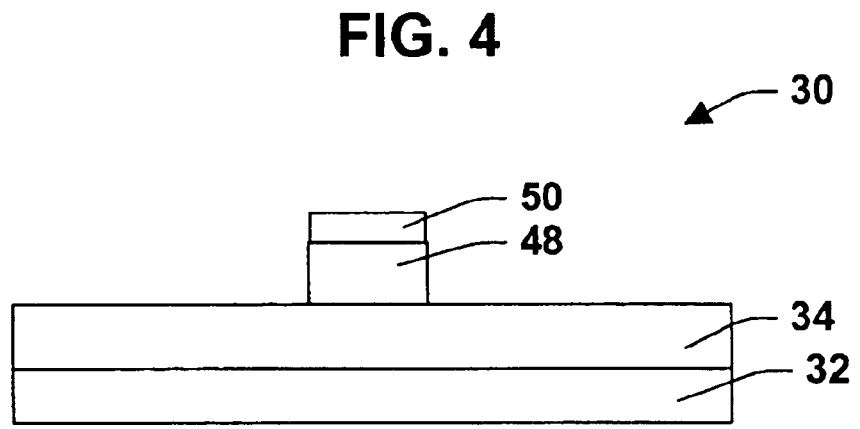
FIG. 5 illustrates a cross sectional view of a method of making a PLC in accordance with another aspect of the present invention.

Referring to FIG. 5, the patterned hard mask 46 is used as a mask to shape the underlying top cap layer 38 and the waveguide core layer 36 into a waveguide core 48 covered by a top cap 50. Wet or dry, liquid or plasma etching techniques may be employed, and portions of the top cap layer 38 and the waveguide core layer 36 may be removed with one etchant, or with two etchants in two distinct acts. In one embodiment, an anisotropic etching process, such as reactive ion etching, is employed to pattern the top cap layer 38 and the waveguide core layer 36 into a waveguide core 48 covered by a top cap 50. The top cap 50 covers the upper portion or top surface of waveguide core 48 since the combined structure is formed from two continuous layers of material. The top cap 50 does not cover the entire surface waveguide core 48 above the bottom clad layer 34 (does not cover the waveguide core 48 sidewalls).

In one embodiment, the waveguide core 48 has a width of about 1 micron or more and about 20 microns or less. In another embodiment, the waveguide core 48 has a width of about 2 microns or more and about 10 microns or less. In yet another embodiment, the waveguide core 48 has a width of about 5 microns or more and about 8 microns or less. The waveguide core 48 may have any of a square, rectangular, or other geometric structure cross section. The top cap 50 has substantially the same width as the waveguide core 48, and extends substantially the entire length of the waveguide core 48.

The thickness of the top cap 50 is sufficient to reduce polarization dependent wavelength shift by balancing, equalizing, and/or reducing stress imposed on the waveguide core 48 (compared to structures where a top cap 50 is not present). The thickness of the top cap 50 depends on the identity of the materials that make up the PLC, the environment in which the PLC is to operate, and other factors affecting stress imposed upon the waveguides of the subsequently formed PLC. In one embodiment, the thickness of the top cap is about 0.05 microns or more and about 10 microns or less. In another embodiment, the thickness of the top cap is about 0.1 microns or more and about 5 microns or less. In another embodiment, the thickness of the top cap is about 0.25 microns or more and about 3 microns or less. The equations presented above can facilitate determining a top cap layer thickness that balances/mitigates stress components on the waveguide core.

Generally speaking, the thickness of the top cap 50 is determined by providing a top cap thickness where the resultant stress on a waveguide in the x direction is substantially equal to the stress in the y direction. In this connection, the stresses in different directions on the waveguide cores, at different thicknesses of top cap layers, can be determined by one skilled in the art using routine experimentation and the guidance provided by the equations above. For example, a graph plotting stress on the waveguide cores in a certain direction versus top cap layer thickness can be generated. At the top cap thickness where stress differences in the x and y directions on the waveguides are minimized, or at the thickness where the stress differences on the waveguide cores in the x and y directions are the same, such top cap layer thickness is employed.

Figure 7:
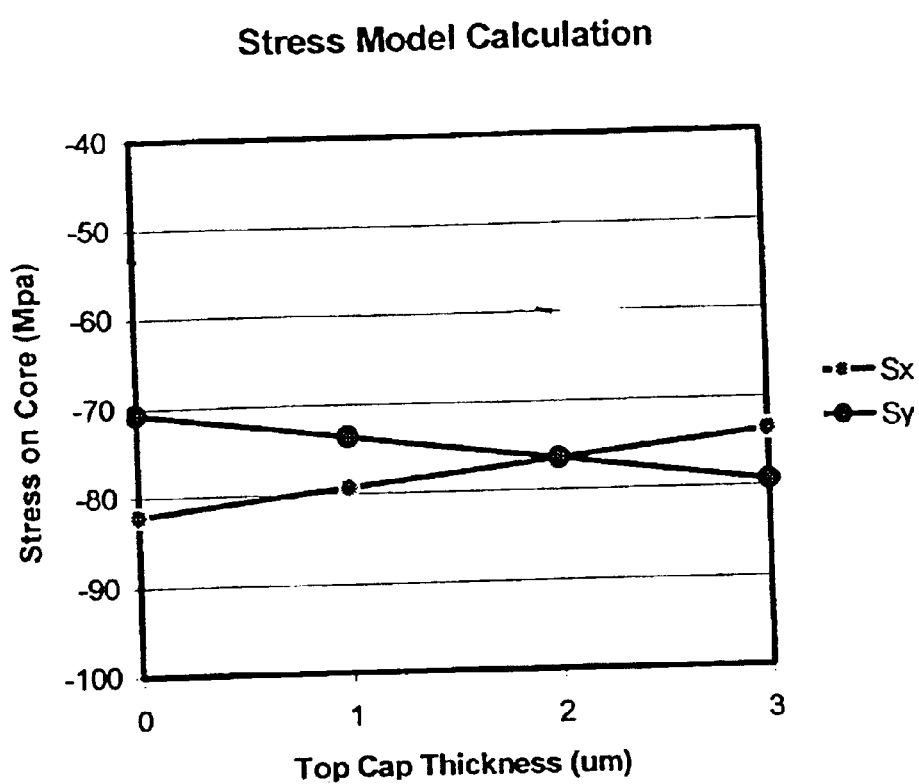
FIG. 7 is graph plotting stress on a waveguide in certain directions versus top cap thicknesses.

An example is shown in FIG. 7, which shows a graph comparing stress on a waveguide in the x direction versus stress on the waveguide in a y direction, which perpendicular to the x direction, relative to top cap thickness. In this example, stress in the x and y directions is equal at a top cap thickness of 2 microns.

After the waveguide core 48 and the top cap 50 are formed, the patterned hard mask 46 (or over the patterned photoresist in the event a hard mask layer is not employed) is removed from the structure 30. Wet or dry, liquid or plasma etching techniques may be employed, so long as the waveguide core 48 and the top cap 50 are not substantially degraded by the removal of the patterned hard mask 46.

Figure 6:
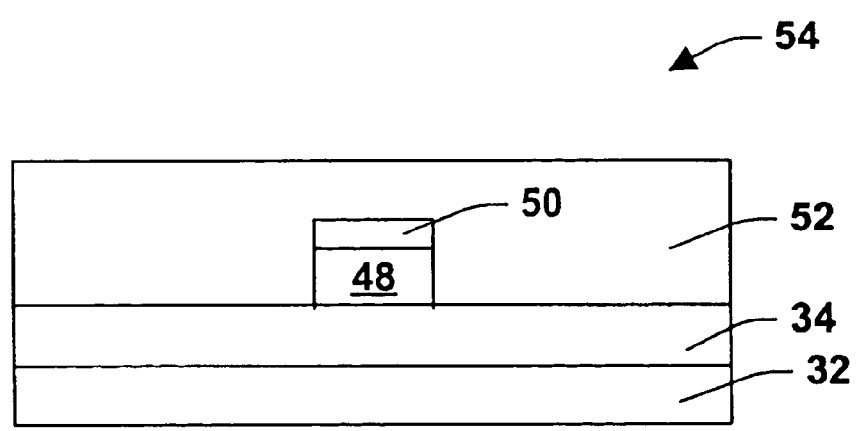
FIG. 6 illustrates a cross sectional view of another PLC in accordance with one aspect of the present invention.

Referring to FIG. 6, a top clad layer 52 is formed over the waveguide core 48, the top cap 50, and exposed portions of the bottom clad layer 34 to provide a PLC 54 in accordance with an aspect of the present invention. The top clad layer 52 is made of one the materials that may be employed for one of the waveguide core layer 36, the top cap layer 38, and the bottom clad layer 34 mentioned above, and the top clad layer 52 may be made of the same or different material with relation to the top cap layer 38, and the bottom clad layer 34. In one embodiment, the top clad layer 52 and the top cap layer 38 are made of the same or different material with different coefficients of thermal expansion between these two layers. The top clad layer 52 is made in any suitable manner including those described above in connection with forming the waveguide core layer 36, the top cap layer 38, and the bottom clad layer 34. The PLC 54 may contain additional layers and structures, such as heaters, risers, connectors, and other structures.

While not wishing to be bound by any theory, it is believed that the top cap waveguide structure contributes to mitigated and/or symmetric stress distribution on the waveguide cores within a PLC. Alternatively or additionally, it is believed that forming the top cap waveguide structure decreases the need for doping the top clad layer in an attempt to match coefficients of thermal expansion between the top clad layer and the substrate.

In one embodiment, the PLC/AWG of the present invention have a polarization dependent wavelength shift of about 0.05 nm or less. In another embodiment, the PLC/AWG of the present invention have a polarization dependent wavelength shift of about 0.01 nm or less. In yet another embodiment, the PLC/AWG of the present invention have a polarization dependent wavelength shift of about 0.005 nm or less.

In one embodiment, the present invention enables reducing insertion loss in a PLC by about 0.5 dB or more compared to a PLC without a top cap layer as required by the present invention. In yet another embodiment, the present invention enables reducing insertion loss in a PLC by about 0.25 dB or more compared to a PLC without a top cap layer as required by the present invention.

In one embodiment, the present invention enables reducing polarization dependent wavelength shift by about 50% or more in a PLC compared to a PLC without a top cap layer as required by the present invention. In another embodiment, the present invention enables reducing polarization dependent wavelength shift by about 75% or more in a PLC/AWG compared to a PLC/AWG without a top cap layer as required by the present invention. In another embodiment, the present invention enables reducing polarization dependent wavelength shift to about 0.01 nm or less in a PLC/AWG compared to a PLC/AWG without a top cap layer as required by the present invention. In yet another embodiment, the present invention enables reducing polarization dependent wavelength shift to about 0.005 nm or less in a PLC/AWG compared to a PLC/AWG without a top cap layer as required by the present invention.

Although the invention has been shown and described with respect to certain illustrated implementations, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes", "including", "with", "has", "having", and variants thereof are used in either the detailed description or the claims, these terms are intended to be inclusive in a manner similar to the term "comprising."

What is claimed is:

1. A method of reducing waveguide birefringence in a planar lightwave circuit, comprising:

providing a top cap layer over an upper portion of a waveguide to reduce birefringence within the planar lightwave circuit, the top cap layer having a thickness of about 0.05 microns or more and about 10 microns or less and positioned between the waveguide and a top clad layer, the planar lightwave circuit having the top cap layer over the upper portion of the waveguide has a polarization dependent wavelength shift of about 0.01 nm or less.

2. The method according to claim 1, wherein the bottom clad layer, the waveguides, the top cap layers, and top clad layer independently comprise at least one material selected from the group consisting of doped silica, undoped silica, thermo-optic polymers, electro-optic polymers, InP, GaAs, germanium, silicon oxynitride, tetraethylorthosilicate, phosphosilicate glass, fluorosilicate glass, borophosphosilicate glass, borophospho-tetraethylorthosilicate, germanium phosphosilicate glass, germanium borophosphosilicate glass, and germanium posophosphosilicate.

3. The method according to claim 1, wherein the waveguide has a width of about 1 microns or more and about 20 microns or less and a thickness of about 1 microns or more and about 20 microns or less.

4. The method according to claim 1, wherein the top cap layer has a thickness of about 0.1 microns or more and about 5 microns or less.

5. The method according to claim 1, wherein the planar lightwave circuit having the top cap layer over the upper portion of the waveguide has a polarization dependent wavelength shift of about 0.005 nm or less.

6. The method according to claim 1, wherein the planar lightwave circuit having the top cap layer over the upper portion of the waveguide has a polarization dependent wavelength shift reduced by about 50% or more compared to a similar planar lightwave circuit not having the top cap layer over the upper portion of the waveguide.

7. A planar lightwave circuit, comprising:
a bottom clad layer on a substrate;
at least one waveguide on the bottom clad layer, each waveguide having a top cap layer on an upper surface thereof, the top cap layer having a thickness of about 0.1 microns or more and about 5 microns or less; and
a top clad layer over the waveguides having the top cap on the upper portion thereof.

8. The planar lightwave circuit according to claim 7, wherein the bottom clad layer, the waveguides, the top cap layers, and top clad layer independently comprise at least one material selected from the group consisting of doped silica, undoped silica, thermo-optic polymers, electro-optic polymers, InP, GaAs, germanium, silicon oxynitride, tetraethylorthosilicate, phosphosilicate glass, fluorosilicate glass, borophosphosilicate glass, borophospho-tetraethylorthosilicate, germanium phosphosilicate glass, germanium borophosphosilicate glass, and germanium posophosphosilicate.

9. The planar lightwave circuit according to claim 7, wherein the waveguide has a width of about 1 micron or more and about 20 microns or less and a thickness of about 1 micron or more and about 20 microns or less.

10. The planar lightwave circuit according to claim 7, wherein the planar lightwave circuit has a polarization dependent wavelength shift of about 0.05 nm or less.

11. The planar lightwave circuit according to claim 8, wherein the bottom clad layer, the waveguides, the top cap layers, and top clad layer are made of different materials.

12. The planar lightwave circuit according to claim 8, wherein the waveguides comprise at least one material selected from the group consisting of doped silica, phosphosilicate glass, and germanium phosphosilicate glass; the top cap layer comprises at least one material selected from the group consisting of doped silica, undoped silica, tetraethylorthosilicate, fluorosilicate glass, borophosphosilicate glass, borophosphotetraethyl-orthosilicate glass, and germanium borophosphosilicate glass; and top clad layer comprises at least one material selected from the group consisting of doped silica, undoped silica, tetraethylorthosilicate, fluorosilicate glass, borophosphosilicate glass, borophosphotetraethyl-orthosilicate glass, and germanium borophosphosilicate glass.

13. The planar lightwave circuit according to claim 7 comprising an arrayed waveguide grating.

14. A method of making a planar lightwave circuit, comprising:
forming a bottom clad layer on a substrate;
forming a waveguide layer on the bottom clad layer;
forming a top cap layer on the waveguide layer, the top cap layer having a thickness of about 0.05 microns or more and about 10 microns or less;
patterning the waveguide layer and the top cap layer using a mask to form waveguides having a top cap on an upper portion thereof; and
forming a top clad layer over the waveguides having the top cap on the upper portion thereof to provide the planar lightwave circuit.

15. The method according to claim 14, wherein the mask used to form the waveguides having the top cap on the upper portion thereof comprises a hard mask.

16. The method according to claim 14, wherein the waveguide layer and the top cap layer are patterned using an anisotropic etching process.

17. The method according to claim 14, wherein the waveguide layer and the top cap layer are formed by one of low pressure chemical vapor deposition and plasma enhanced chemical vapor deposition.

18. The method according to claim 14, wherein patterning the waveguide layer and the top cap layer to form the waveguides having the top cap on the upper portion thereof comprises:
forming a hard mask layer over the top cap layer;
patterning a photoresist over the hard mask layer exposing portions of the hard mask layer;
removing the exposed portions of the hard mask layer to form a patterned hard mask layer; and
using the patterned hard mask layer as the mask.

19. The method according to claim 14, wherein the top cap layer has a thickness of about 0.1 microns or more and about 5 microns or less.

20. The planar lightwave circuit made in accordance with the method of claim 14.

* * * * *